United States Patent [19]

Johnson

[11] 4,356,574
[45] Nov. 2, 1982

[54] FAUCET ASSEMBLY WITH PINCH VALVES

[75] Inventor: Dwight N. Johnson, San Marcos, Calif.

[73] Assignee: JH Industries, Inc., San Marcos, Calif.

[21] Appl. No.: 303,158

[22] Filed: Sep. 17, 1981

Related U.S. Application Data

[62] Division of Ser. No. 147,701, May 8, 1980, Pat. No. 4,313,469.

[51] Int. Cl.³ ............................................. E03C 1/04
[52] U.S. Cl. .......................................... 4/192; 4/191; 4/DIG. 7; 137/801; 137/606
[58] Field of Search ..................... 4/192, 191, DIG. 7; 137/637, 606, 801

[56] References Cited

U.S. PATENT DOCUMENTS

| | | | |
|---|---|---|---|
| 2,848,721 | 8/1958 | Fredrickson | 4/192 |
| 3,010,474 | 11/1961 | Moen | 4/192 X |
| 3,092,845 | 6/1963 | Mustee | 4/192 |
| 3,448,768 | 6/1969 | Keller | 4/192 |
| 3,600,723 | 8/1971 | Mongerson | 4/192 |
| 3,765,455 | 10/1973 | Countryman | 137/801 UX |
| 3,796,380 | 3/1974 | Johnson et al. | 137/801 X |
| 4,074,697 | 2/1978 | Saether | 137/801 X |

Primary Examiner—Henry K. Artis
Attorney, Agent, or Firm—Mason, Kolehmainen, Rathburn & Wyss

[57] ABSTRACT

A faucet assembly including pinch valves for controlling the flow of hot and cold water. A base is secured to the deck of a sink from above the deck and a body secured to the base completes the faucet housing. A spout extends over the basin and includes an outlet at its end. Two flexible tubes are connected to a mixing chamber near the outlet and extend through the spout and through the base for connection to hot and cold water conduits remote from the sink deck. The tubes are normally pinched closed adjacent the mixing chamber by springs, and operating levers at opposite sides of the spout rotate about a shaft and operate a linkage and valve mechanism for overcoming the spring forces to permit flow. Lost motion connections render the spring closing forces independent of lever position. A cross bar limits lever movement and provides a support surface against which the tubes are pinched. The tubes are located in the valve region by a block which serves as a barrier to leakage.

9 Claims, 16 Drawing Figures

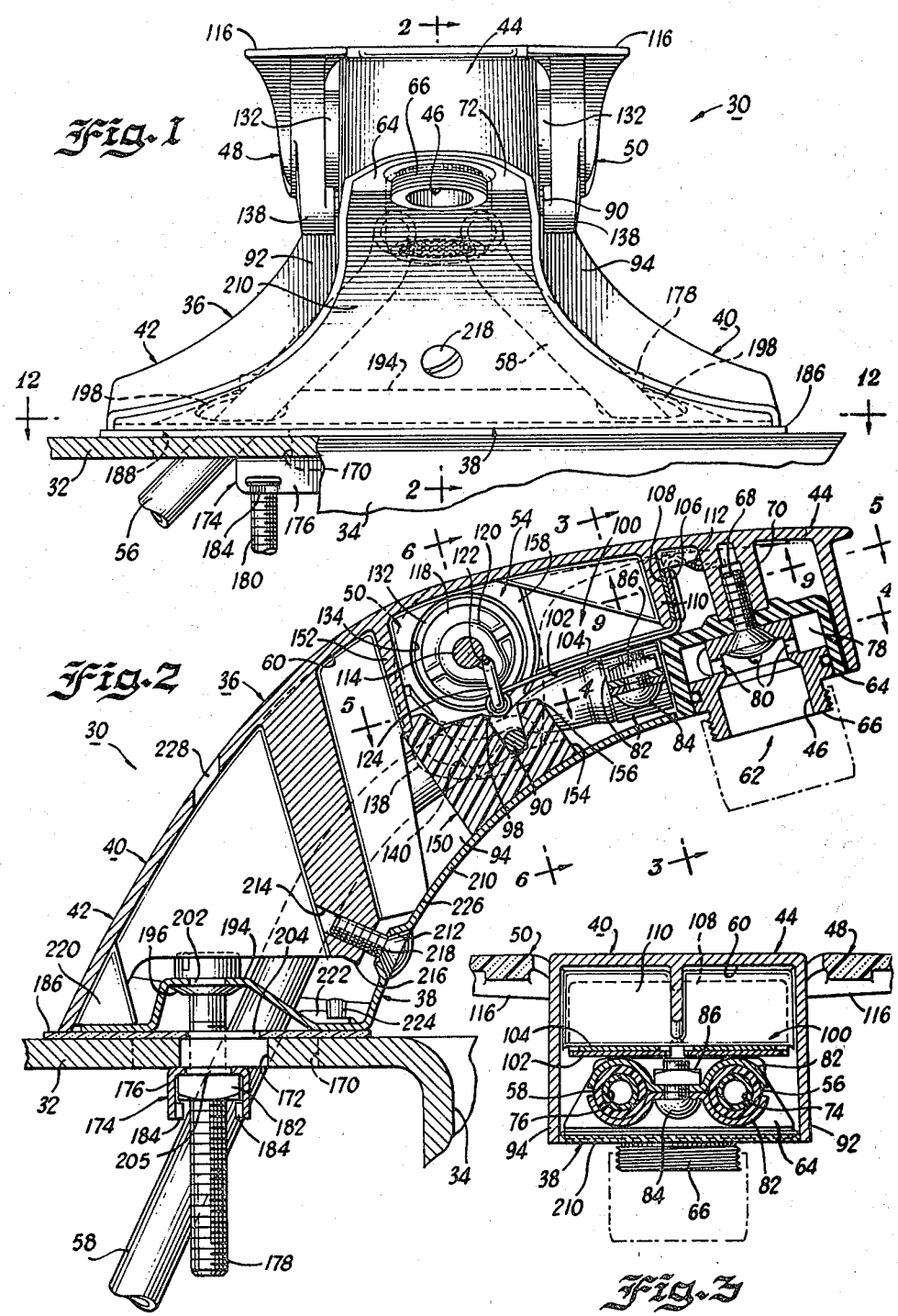

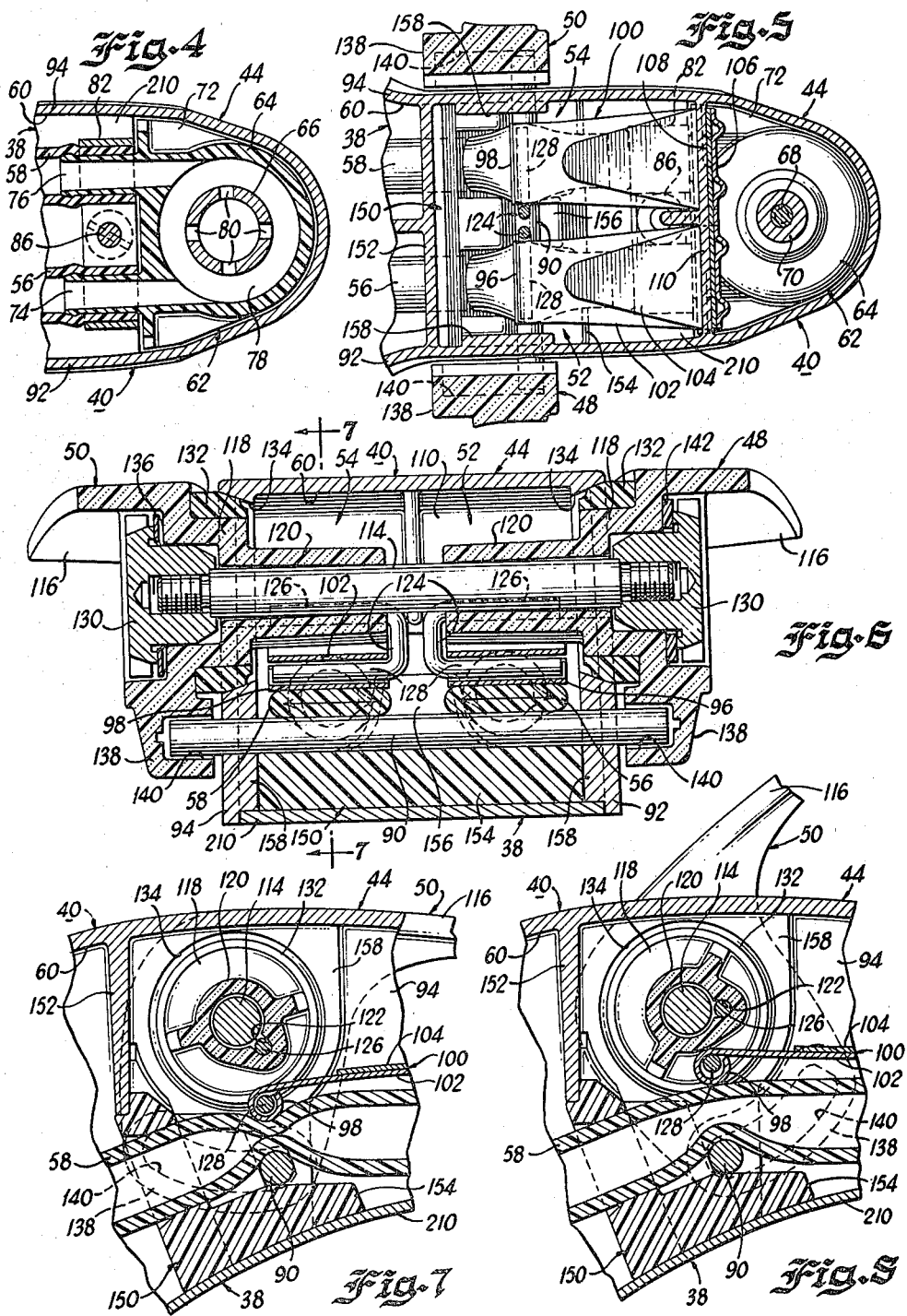

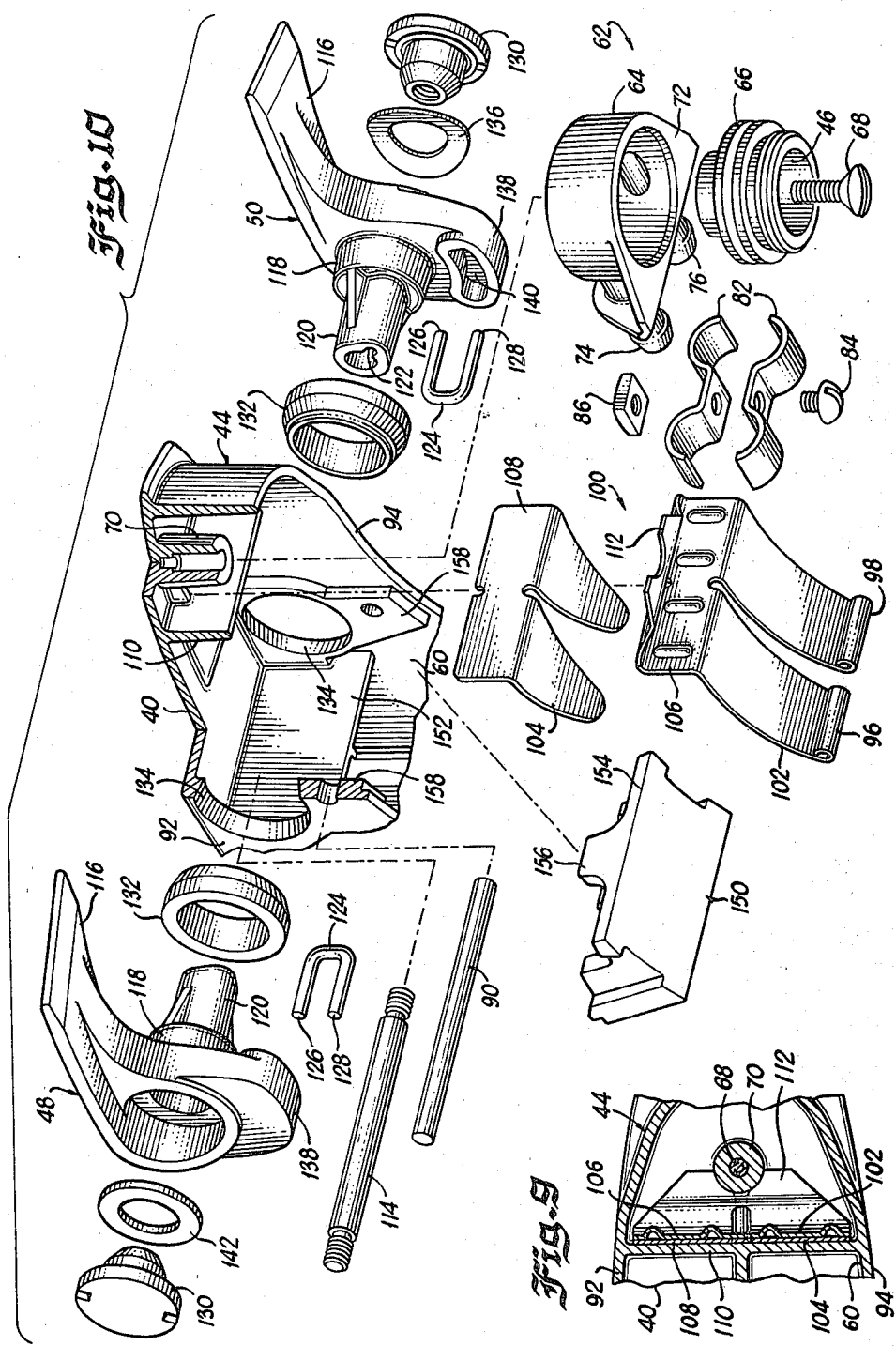

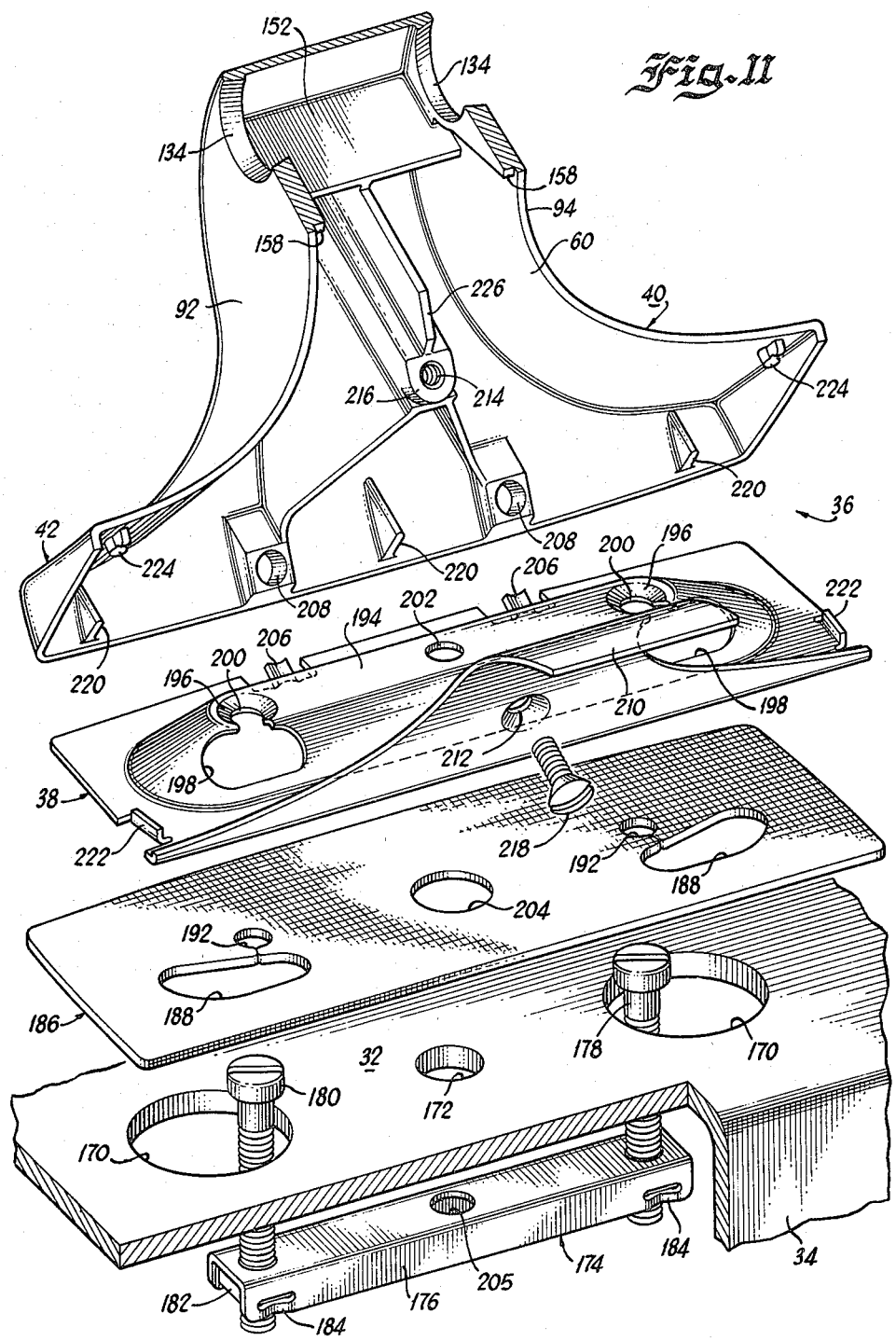

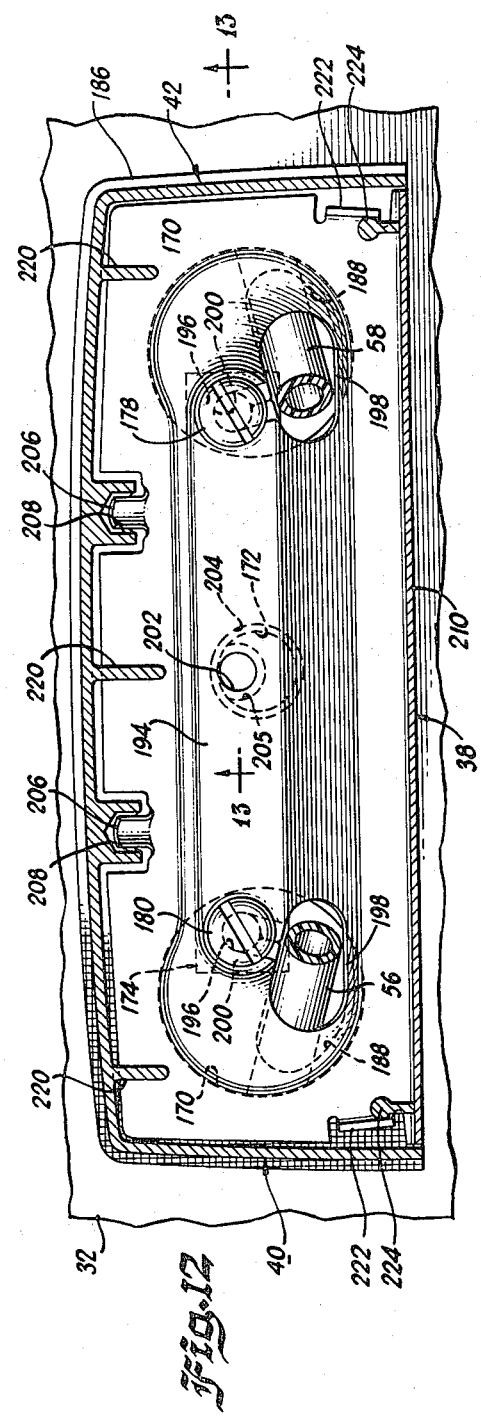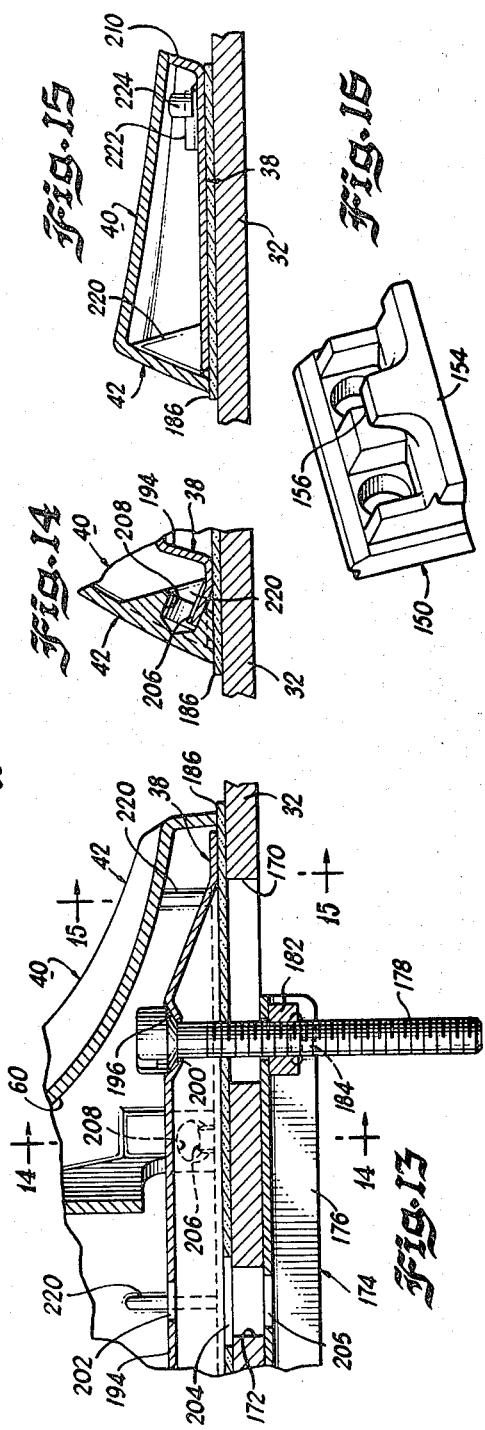

FAUCET ASSEMBLY WITH PINCH VALVES

This application is a division of application Ser. No. 147,701, filed May 8, 1980, now U.S. Pat. No. 4,313,469.

The present invention relates to faucet assemblies and more particularly to improvements in faucet assemblies having pinch valves for controlling flow.

Residential faucet assemblies commonly in use include inlets for hot and cold water and a valving arrangement for controlling the flows of hot and cold water, the flows being mixed and delivered to an outlet through a common spout. The faucet is typically mounted to a sink deck at the rear of a basin by means of fasteners installed from beneath the deck. Tubes or pipes are connected to the faucet inlets at the sink deck and to available hot and cold water fittings located below and remote from the sink deck.

The most familiar type of valving arrangement is the compression seal or washer mechanism including two separate hot and cold water handles each being rotatable to move a sealing washer into and out of engagement with a valve seat. In addition, various two handle washerless faucet assemblies have been developed, including rubber seal and ceramic shearing types, and diaphragm types.

Another type of faucet assembly in wide use at the present time is a single control faucet having a single lever or knob movable in a predetermined pattern for controlling both the volume of flow and the proportion of hot and cold water. Typically a single cartridge of the rubber seal or ceramic shearing type or of the sliding shaft type controls the valving of the hot and cold water flows.

Conventional faucet assemblies of the types referred to above are subject to a number of disadvantages. One problem is that they are difficult to install. In most modern sink fixture installations, access to the region under the sink deck and behind the basin is difficult and inconvenient. Yet, when a conventional faucet assembly is installed, it is necessary to install attachment fasteners in this region, and it is also necessary to connect water supply tubes or pipes to the faucet at the underside of the sink deck.

The use of metal tubes to interconnect the faucet and the hot and cold water supply fittings leads to other difficulties. For example, the tubes due to their relatively rigid nature can be jarred or stressed by contact with items placed or stored under the sink and as a result leaks can develop due to loosening of the interconnections either at the underside of the sink deck or at the remote water supply fittings.

It is possible with conventional faucet assemblies for internal leakage to develop within the faucet, for example at the valve mechanism or its connections. In this case, leakage water can descend through the sink deck openings to the region beneath the sink possibly leading to damage caused by dampness. Moreover, in order to correct such leakage problems it is typically necessary to recondition the faucet assembly as by replacing stem packings, valve cartridges or the like with replacement components or materials.

Another serious difficulty encountered with conventional faucet assemblies is that performance deteriorates over a period of time due to mechanical wear as well as cavitation damage. Mechanical wear and abrasion can occur where parts of the faucet assembly are wetted so that lubrication is washed away and where high contact loading exists between moving surfaces. Cavitation due to flashing or boiling of water in a low pressure environment followed by condensation to the liquid state is a serious problem when the flow control valve is partly open, particularly when water temperatures and/or inlet pressures are high. Cavitation damage typically occurs to the malleable parts of a valve structure, such as the metal seat in a conventional compression seal faucet.

The operating characteristics of conventional faucet assemblies also lead to disadvantages. In many units, particularly of the single lever type, it may be difficult to adjust the operating handle for low water flows. This problem can arise where the initial force required to open the operating handle is larger than the force required to continue its movement once opened. A similar problem is that in some types of faucet assemblies the closing force experienced by the user increases near the closed position so that the faucet is not consistently completely closed. Thus, the faucet may be left in a low flow condition encouraging waste of water and cavitation damage.

Double handle devices have the disadvantage that for operation in a mixing mode with both cold and hot water flow, it is necessary to perform two separate adjustment operations normally with two bands. While this particular difficulty is overcome with a single lever unit, the single lever device is in turn subject to the difficulty that it leads to waste of hot water. Since in a single lever unit it is either inconvenient or impossible to use only cold water, typically both hot water and cold water are discharged whenever the faucet is operated.

In an attempt to overcome some of the problems and difficulties described above, faucet assemblies making use of pinch valves wherein a flexible conduit is pinched closed by a valving mechanism have been proposed. Since elastic, compliant materials, such as the flexible conduit of a pinch valve, can absorb shock waves, pinch valves resist cavitation damage to which other types of valve arrangements are subject. Moreover, since in a pinch valve the moving parts of the mechanism aside from the flexible tube walls are non-wetted, the problems experienced in the past due to mechanical wear and abrasion are reduced.

Known faucet assemblies incorporating pinch valves have been subject to other difficulties, and have not displaced the various conventional types in the marketplce. Known pinch valve arrangements have been unduly complex and expensive, difficult to install and service, and inconvenient to use. Moreover, designs suggested in the past have not provided solutions to problems which can arise due to compression set of the flexible conduit material leading to incomplete closing, or the problem of excessive pinching forces which may damage the flexible tubing.

Among the objects of the present invention are to provide improvements in faucet assemblies and to provide an improved faucet assembly incorporating pinch valves. Other objects are to provide a residential faucet capable of conveniently and easily being installed in a sink deck without the necessity for completing connections or attachments at the underside of the deck behind the basin; and to provide a faucet assembly in which reconditioning or repair of the valving mechanism can be effected easily and without the installation of replacement components or materials.

Other objects of the present invention are to provide a faucet assembly having pinch valve mechanisms and to provide pinch valve assemblies which are extremely simple and inexpensive yet consistent and reliable in operation, and which are not subject to damage from excessive closing forces nor to incomplete closure due to compression set of the flexible pinch valve material. A further object is to provide a faucet assembly wherein the possibility of internal leakage is greatly reduced, and wherein if leakage occurs, damage due to flow to the under sink region is prevented.

Further objects of the invention are to provide a faucet assembly wherein complete closure of the valve mechanism is encouraged, wherein the ease of one hand operation of prior single element faucets as well as the reduction in use of hot water of prior two handle faucets are combined in a single faucet assembly, and to provide a faucet assembly which can easily be adjusted to low water flows and which can easily be operated in a cold water only or hot water only mode.

More general objects of this invention are to provide an improved faucet assembly and to provide an improved pinch valve mechanism, each capable of overcoming problems and disadvantages experienced in the past.

In brief, in accordance with the above and other objects and advantages of the present invention, there is provided a faucet assembly for use with a sink and with water supply fittings remote from the sink deck. The faucet assembly includes a housing including a base portion together with means for mounting the base portion on the sink deck. A spout extends from the base portion and has an outlet at its remote end over the sink basin. A mixing chamber is adjacent to and communicates with the outlet, and a recess is defined within the spout extending from the mixing chamber to the faucet base portion.

In accordance with the invention, a pair of continuous, elongated, flexible tubular conduits are connected to the mixing chamber and extend through the recess to the base portion. In addition, the continuous conduits extend through the base portion and through the sink deck for connection directly to the remote water supply fittings.

A cross member extends across the spout recess near the mixing chamber and engages and provides support for one side of the conduits. A shaft extends across the recess and an operating lever is rotatably mounted on each end of the shaft. Each operating lever includes a handle portion located externally of the spout. A pair of pinch members are engageable respectively with the two conduits opposite the cross member. A spring means independently and resiliently forces the pinch members against the conduits normally to maintain the conduits in a pinched closed condition. A pair of linkages each coupled between one operating lever and one pinch member serve to withdraw the pinch member against the spring force to open the corresponding conduit when the operating lever is moved from the closed position.

In accordance with a feature of the invention, a positive stop is provided for the operating levers in the closed position. In addition, the linkage includes a loose fit or a lost motion connection so that the closing force applied by the spring in the closed position is independent of the lever position. As a result, the closing force remains essentially constant despite compression set of the conduits. Moreover, excessive closing forces cannot be applied to the conduits and damage to the conduits is avoided. In order to assure that the closed position of the operating levers is fixed with respect to the conduit closed condition, the cross member not only provides support surfaces for the conduits at the pinch region, but also provides stops for both the closed and the open positions of the lever. Due to the force characteristics achieved with the use of the spring closing combined with the lever and linkage for opening the valve by overcoming these spring forces, full closure of the pinch valves is encouraged and adjustment to any position including low flow positions is easily accomplished.

In accordance with a further feature of the invention, the operating levers are mounted on a single shaft traversing the spout. Retaining members are carried at the ends of the shaft to capture the operating levers between the retaining elements and the spout walls. A spring is held in compression to avoid looseness in the assembly and to apply a compressive force to a bearing surface provided between the operating levers and the spout walls. In order to avoid unintential simultaneous rotation of both operating levers, an antifriction device is also incorporated in the assembly.

The construction of the pinch valve mechanisms is such that cavitation damage, mechanical wear, and leakage due to wear or failure of the valve is eliminated or greatly reduced. Should leakage arise, leakage flow through the spout and the base to the under sink area is prevented by a locating element which not only supports and locates the conduits in the valving region, but also acts as a barrier in the spout recess preventing undesired leakage flow. In addition, should blockage or leakage be experienced in the valve area, repair or reconditioning is easily accomplished by detaching the mixing chamber from the spout, pulling the tubes out through the spout for a short distance, cutting off the end portions of the tubes, and reattaching the tubes to the mixing chamber prior to reassembly. Thus reconditioning requires no replacement components or materials.

Since the flexible water supply conduits are continuous from the mixing chamber to the fittings remote from the sink deck, during installation of the faucet assembly it is not necessary to complete water connections at the underside of the sink deck. This greatly simplifies installation of the unit. In addition, since the tubes are pliable, the tubes and the water supply connections are not subject to damage as might occur when the under sink water supply tubes are inadvertently struck or moved.

Installation of the faucet assembly is further facilitated because the faucet housing is installed from above the sink deck without the necessity for installing fasteners or the like at the underside of the sink. The housing includes a base plate and a body. The base plate is mounted above the deck by a tie bar assembly inserted beneath the deck from above the deck through the connection holes existing in the deck. Fasteners associated with the tie bar assembly are tightened from above to draw the tie bar assembly and base plate toward one another in clamping relationship with the deck. The faucet body is then attached to the base plate, with the water supply conduits extending through the connection holes in the deck.

In accordance with the invention, the handles of the operating levers are disposed conveniently at opposite sides of the faucet spout. Thus they can easily be manipulated with a single hand, and in addition, either operating lever can be readily moved independently of the other so that unintentional or excessive use of hot water is prevented.

The present invention, together with the above and other objects and advantages, may best be understood from the following detailed description of the embodiment of the invention illustrated in the accompanying drawings, wherein:

FIG. 1 is a front view of a faucet assembly constructed in accordance with the present invention and illustrated in an installed position with respect to a sink deck;

FIG. 2 is a sectional view on an enlarged scale taken along the line 2—2 of FIG. 1;

FIG. 3 is a sectional view taken along the line 3—3 of FIG. 2;

FIG. 4 is a fragmentary sectional view taken along the line 4—4 of FIG. 2 and illustrating the mixing chamber and outlet regions of the faucet;

FIG. 5 is a fragmentary sectional view taken along the line 5—5 of FIG. 2 and illustrating the valving region as well as the outlet and mixing chamber regions of the faucet;

FIG. 6 is a sectional view taken along the line 6—6 of FIG. 2 illustrating the pinch valve mechanism of the faucet;

FIG. 7 is a sectional view taken along the line 7—7 of FIG. 6;

FIG. 8 is a view similar to FIG. 7 illustrating a pinch valve mechanism in the open rather than the closed position;

FIG. 9 is a fragmentary sectional view taken along the line 9—9 of FIG. 2;

FIG. 10 is an exploded perspective view, with some portions broken away, illustrating components of the faucet assembly, and particularly the valving, mixing chamber and outlet portions, in a disassembled condition;

FIG. 11 is an exploded perspective view, with some portions broken away, illustrating components of the faucet assembly and in particular the mounting of the faucet assembly to a sink deck;

FIG. 12 is a sectional view, on an enlarged scale, taken along the line 12—12 of FIG. 1;

FIG. 13 is a fragmentary sectional view taken along the line 13—13 of FIG. 12;

FIG. 14 is a fragmentary sectional view taken along the line 14—14 of FIG. 13;

FIG. 15 is a sectional view taken along the line 15—15 of FIG. 13; and

FIG. 16 is a perspective view of the locator block of the faucet.

Having reference now to the drawings and initially to FIGS. 1 and 2, there is illustrated a faucet assembly designated as a whole by the reference numeral 30 and constructed in accordance with the principles of the present invention. In the illustrated embodiment of the invention, the faucet assembly 30 is a residential lavatory faucet assembly of a four inch center set configuration and is mounted upon the sink deck portion 32 of a lavatory sink fixture also including a basin 34 of which a fragment is seen in FIGS. 1, 2 and 11. It should be understood that principles of the present invention are applicable to faucet assemblies other than the specific residential faucet assembly illustrated in the drawings.

In general, the faucet assembly 30 includes a housing generally designated as 36 and formed of two components, one being a base plate 38 and the other being a body 40. The assemblied housing 36 includes a lowermost or base portion generally designated as 42 supported upon the sink deck 32, as well as a spout portion generally designated as 44 projecting upwardly and forwardly from the base portion 42 over the sink basin 34. An outlet 46 discharges hot water or cold water or a mixture into the basin under the control of a pair of operating levers 48 and 50 mounted at opposite sides of the spout portion 44.

In accordance with a feature of the present invention, flow through the faucet assembly 30 is controlled in response to movement of the levers 48 and 50 by a pair of pinch valve assemblies generally designated as 52 and 54 and best illustrated in FIGS. 6–8. In accordance with another feature of the present invention, the faucet assembly 30 includes a pair of water supply conduits 56 and 58 serving as components of the pinch valve assemblies 52 and 54. The conduits 56 and 58 are continuous and uninterrupted throughout their lengths, and extend along the spout portion 44, through the base portion 42 and the sink deck 32, and extend beneath the sink deck 32, as indicated in FIG. 2, for direct interconnection with hot and cold water supply fittings normally located remote from the sink deck. As a result, no water supply connections are made at the underside of the sink deck adjacent the faucet base portion 42.

Proceeding now to a more detailed description of the structure and operation of the faucet assembly 30, the water supply conduits 56 and 58 are formed of a flexible tube material capable of being pinched closed to shut off flow, and capable of reopening due to their own resiliency and/or water pressure to permit flow when not pinched closed. The tubes are of more than ample length to reach from the base portion 42 of the installed faucet assembly 30 to water supply fittings typically located beneath the sink fixture installation at a remote location such as a wall or floor. The tubes should be of a material compatible with both hot and cold water under pressure, and should be sturdy enough to withstand many openings and closings of the pinch valve assemblies 52 and 54 and to resist breaking, damage and kinking in the under sink area. One tubing which possesses the required characteristics is a dacron reinforced vinyl plastic tubing designated as Tygon inner braided tubing.

Housing 36 is substantially hollow in that a recess 60 is defined within the body 40 and base plate 38. The recess 60 extends from the region of the outlet 46 to the base portion 42 of the housing. A mixing chamber assembly 62 is supported within the spout portion 44 adjacent the outlet 46, and the water supply tubes 56 and 58 are connected to and extend from the mixing chamber assembly. The assembly 62 includes a mixing chamber component 64 together with an outlet spout member 66, these components being held in assembled relation and being releasably mounted to the faucet assembly 30 by means of a screw fastener 68 threaded into a boss 70 formed in the body 40. As best seen in FIGS. 1, 4 and 10, the mixing chamber 64 includes a lower wall 72 cooperating with the base plate 38 to form a continuous lower wall for the spout portion 44.

The ends of the water supply tubes 56 and 58 are releaseably connected to a pair of inlet nipples 74 and 76 (FIGS. 4 and 11) of the mixing chamber 64 opening into an annular mixing area 78 defined between the mixing chamber 64 and the outlet spout 66. Ports 80 in the outlet spout 66 (FIGS. 2 and 4) permit water to flow from the mixing area 78 to the outlet 46. The tubes 56 and 58 are retained on the nipples 74 and 76 by a pair of clamps 82 releaseably held by a screw 84 and nut 86. In accordance with conventional practice, an aerator may be attached to threads adjacent the outlet 46 as indicated in broken lines in FIGS. 1-3.

With reference now to the pinch valve assemblies 52 and 54, in response to operation of the levers 48 and 50, the tubes 56 and 58 are selectively pinched closed or are opened, alternatively to prevent or permit flow. A cross bar 90 extends across the recess 60 between spaced apart spout side walls 92 and 94 of the body 40. Cross bar 90 forms a support engaged by both tubes 56 and 58 against which the tubes can be pinched by means of a pair of pinch members 96 and 98. In accordance with a feature of the present invention, the pinch valve assemblies 52 and 54 are normally maintained in a closed position because the pinch members 96 and 98 are normally biased by a spring assembly generally designated as 100 to pinch the tubes 56 and 58 against the cross bar 90 to the closed position illustrated in FIGS. 2 and 5-7.

Spring assembly 100 includes a primary leaf spring member 102 having a pair of legs, and in the illustrated arrangement the pinch members 96 and 98 are constituted of rolled end portions of the legs of the primary spring 102. Spring biasing force is augmented by a secondary leaf spring 104 having a pair of legs overlying the legs of the primary spring 102. The springs 102 and 104 include base portions 106 and 108 held against a spring support wall 110 defined within the body 40. As seen in FIGS. 2 and 9, a projection 112 of the base 106 is wedged between the wall 110 and the boss 70 for holding the spring assembly 100 in position without the use of fasteners or other components. The mixing chamber 64 also cooperates in holding the springs 102 and 104 in position.

Operating levers 48 and 50 are mounted for rotation about a lever shaft 114 extending across the recess between the spout side walls 92 and 94. In the illustrated embodiment of the invention, the lever shaft 114 extends parallel with the cross bar 90 and is disposed on the opposite side of the tubes 56 and 58 from the cross bar 90. Each operating lever includes a handle portion 116, a hub portion 118, and a collar portion 120 surrounding the shaft 114 and extending inwardly from the respective wall 92 or 94 into the recess 60 and above the respective tube 56 or 58.

Each collar portion 120 is provided with an axially extending recess 122 (FIGS. 2, 7, 8 and 10). In order to open the valve assemblies 52 and 54 in response to lever rotation, a pair of link members 124 each include a first leg 126 extending into the corresponding recess 122, the leg being captured by the collar portion 120 adjacent the surface of the lever shaft 114. The links 124 are generally U-shaped, and each includes a second leg 128 received within the rolled end portion of the corresponding leg of the primary leaf spring 102.

In the normal closed position of the valve assemblies 52 and 54, the link legs 128 are received loosely within the pinch members 96 and 98. Consequently, in the closed position, the closing forces provided by the spring assembly 100 are independent of the positions of the operating levers 48 and 50. When the lever 48 or the lever 50 is rotated from the closed position (FIG. 7) into an open position (FIG. 8) movement of the lever causes the collar recess 122 and the leg 126 captured therein to rotate about the center of the lever shaft 114 because the legs 126 are eccentric with respect to the center of rotation. This in turn causes the link 124, after limited lost motion, to lift the corresponding pinch member 96 or 98 against the force applied by the spring assembly 100. As the pinch member 96 or 98 is separated or moved away from the cross bar 90, the corresponding supply tube 56 or 58 opens to permit flow.

A pair of retaining elements in the form of end caps 130 are threaded onto the opposite ends of the lever shaft 114 for retaining the operating levers 48 and 50 between the end caps 130 and the spout portion 44 of the housing 36 (FIG. 6). The hub portions 118 of the levers carry tapered sleeve bearings 132 received within tapered openings 134 in the spout side walls 92 and 94. Compression is applied to load the bearings 132 by a spring in the form of a wave washer 136 held in compression between one of the end caps 30 and the corresponding operating lever 50. The bearing load is selected to apply sufficient friction at the bearing surface interface of the bearings 132 and levers 48 and 50 so that when an operating lever 48 or 50 is moved to an open position, the developed frictional force is somewhat greater than the return force applied by the spring assembly 100. The cone shaped bearing surfaces align and center the operating levers and shaft, and the spring washer prevents looseness in the assembly.

The valve assemblies 52 and 54 are operable independently of one another to the end that inadvertent mixing of hot and cold water flows is avoided. In order to assure that motion of one operating lever does not cause movement of the other lever, an antifriction element in the form of a washer 142 of teflon or similar low friction material is received between one of the end caps 130 and the corresponding operating lever 48.

In addition to supporting the tubes 56 and 58 in the pinching region, the cross bar 90 also cooperates with the operating levers 48 and 50 to define the closed and full open positions of the valve assemblies 52 and 54. Each operating lever includes a radial projection 138 having an arcuate recess 140 (FIGS. 6 and 10) receiving an end of cross bar 90. The cross bar 90 engages the ends of the recess 140 in the fully closed (FIG. 7) and the full open (FIG. 8) positions of the lever. The positive stop provided in the closed position assures that excessive pinching forces cannot be applied to the tubes 56 and 58 since in the closed position the legs 128 of the links 124 are received loosely within the pinch members 96 and 98. A consistent closing force is provided by the spring assemblies 100, and due to the lost motion or loose fit connection, the closing force is maintained essentially constant despite compression set or flattening of the tubes 56 and 58 in the pinch regions after a period of use.

The operating characteristics of the faucet assembly 30 are such that only relatively small handle forces are required for rotation of the operating levers. The spring assisted closing force is less than the opening force so that full valve closure is encouraged and so that opening of the valves in excess of the desired amount is avoided. The positive stop in the closed position, wherein the handles 116 are flush with the adjacent spout surface, also encourages full closure. The full open and full closed positions are easily detected by the user and there is no tendency to force the operating levers or valve assemblies beyond these positions. Between the open and closed positions, the operating forces in both the opening and closing directions are smooth and consistent.

Wear of and damage to the pinch valve assemblies 52 and 54 due to causes such as mechanical wear, abrasion and cavitation is minimized due to the use of pinch valve mechanisms incorporating the flexible supply tubes 56 and 58. In the unlikely event that leakage were to occur, such leakage would take place in the region of the valve assemblies or near the ends of the tubes 56 and 58 at the points of their connection with mixing chamber inlet nipples 74 and 76. In order to avoid damage due to such possible leakage, the faucet assembly 30 includes a locator block 150 serving to support and position the tubes 56 and 58 in the region of the pinch valve assemblies 52 and 54 and also serving as a barrier to the flow of leakage water down the spout portion 44 and into the under sink region.

More specifically, the locator block 150 is formed of rubber or similar material and is captured in tight sealing relation between the base plate 38, the spout side walls 92 and 94, and the lip of a downwardly extending interior wall 152 of the body 40. The block 150 includes a pair of side by side openings (FIGS. 7, 8 and 16) slidably yet sealingly receiving the tubes 56 and 58. The block includes a base portion 154 and a separator projection 156 holding the tubes 56 and 58 in position between the cross bar 90 and the pinch members 96 and 98.

In the region of the pinch valve assemblies 52 and 54, the body side walls 92 and 94 include thickened or inwardly projecting portions 158 (FIGS. 6–8, 10 and 11). The side surfaces of the locator block 150 are provided with cooperating recesses (FIGS. 5 and 10) receiving the projecting portions 158 to the end that the block is firmly locked in position within the recess 60 in the spout portion 44. The thickened or projecting portions 158 also encompass the openings for the cross bar 90 as well as the tapered openings 134 for the operating levers 48 and 50 and sleeve bearings 132, thus providing ample strength in these regions.

After a period of use of the faucet assembly 30, repair or reconditioning of the faucet assembly may be required. This necessity could arise in the event of leakage developing adjacent the valve assemblies or the mixing chamber, or alternatively in the event of blockage of a tube 56 or 58 in the region of the valve assemblies by particles or sediment or the like in the water supply. In accordance with an important feature of the invention, reconditioning of the faucet assembly 30 is easily accomplished and requires no replacement components or materials.

More specifically, the faucet assembly 30 is reconditioned by removing the screw fastener 68 from the boss 70 and withdrawing the mixing chamber assembly 62 with the hot and cold water supplies turned off and with the pinch valve assemblies 52 and 54 in the open position. To facilitate removal of the assembly 62, the body 40 may be separated from the base plate 38 in the manner described below. The water supply tubes 56 and 58 are initially supplied in ample length for slack to be present in the under sink area. Consequently, as the mixing chamber assembly 62 is withdrawn, the tubes 56 and 58 may be pulled upwardly and outwardly through the locator block 150 so that the inlet nipples 74 and 76 together with the clamps 82 are accessible at the exterior of the faucet. The clamps 82 are released by disconnecting the screw 84 and nut 86. The end segments of the tubes 56 and 58 may be trimmed by cutting to remove any damaged or blocked end portions. The freshly trimmed ends are reinstalled on the nipples 74 and 76 with the clamps 82 and fasteners 84 and 86. Finally, the tubes 56 and 58 are pulled back through the locator block until the mixing chamber assembly 62 is repositioned and the screw fastener 68 is reinstalled.

In accordance with an important feature of the present invention, the faucet assembly 30 can be installed on the sink deck 32 without the necessity for the installer to reach under the sink deck and behind the basin 34 to position or tighten fasteners or other mounting hardware. The entire installation can be completed from the easily accessible upper surface of the sink deck 32.

Sink deck 32, as illustrated in FIGS. 2, 11 and 12, is of conventional configuration and includes a planar deck portion supplied with a pair of spaced apart connection holes 170 spaced from a center hole 172. In the illustrated arrangement, the holes 170 and 172 are located on four inch centers, this being one common type of lavatory sink fixture configuration. The principles of the present invention are also applicable to other configurations such as, for example, an eight inch center set configuration.

As indicated above, the housing 36 of the faucet assembly 30 includes a base plate 38 and a body 40. The base plate 38 is mounted to the sink deck 32 by means of a tie assembly generally designated as 174 and seen in FIG. 11 including a horizontally extending, generally channel-shaped tie bar 176 with which are associated a pair of vertically extending fasteners 178 and 180. In the illustrated arrangement, the fasteners 178 and 180 are screws having threaded shanks and having heads. To assemble the tie assembly 174, a pair of square nuts 182 (FIGS. 2, 11 and 13) are captured and held against rotation adjacent the ends of the tie bar 176 by retaining projections 184. The fasteners 178 and 180 are threaded into the nuts 182 through openings provided in the tie bar 176. The completed tie assembly 174 as best illustrated in FIG. 11 is of generally U-shape with the tie bar 176 forming the base of the U and with the fasteners 178 and 180 forming the spaced apart legs of the U.

When the faucet assembly 30 is to be installed, the tie assembly 174 is located in the position indicated in FIG. 11. The cross section of the legs, or at least one leg, and the base of the tie assembly 174 is substantially smaller than the diameters of the connection holes 170, the latter typically having a diameter of perhaps one and one quarter inches. As a result, one of the fasteners, for example the fastener 178, can be grasped by its end or head portion and the other fastener, for example the fastener 180, can be inserted through one of the holes 170 from above the deck 32 with the end or head portion of the fastener 180 entering first. The tie assembly 174 is then inserted further with the tie bar 176 entering the hole 170. Finally, with the end or head of fastener 178 remaining above the sink deck 32, the tie assembly 174 is pivoted or rotated to raise the end portion or head of the fastener 180 through the second connection hole 170. At this point, the tie assembly is in the position illustrated in FIG. 11, and is prevented from dropping beneath the sink because one or both of the fasteners 178 and 180 are grasped by the installer.

The next step in installing the faucet assembly 30 is the installation of a gasket 186 at the upper surface of the sink deck 32. As shown in FIG. 2, the gasket 186 seals the base plate 30 and bottom edge of the housing 40 at the deck surface preventing water from seeping under the faucet assembly 30. In order to install the gasket, a pair of relatively large openings 188 in the gasket are placed over the heads or ends of the fasteners 178 and 180. This is done one fastener at a time so that the installer may continue to grasp the other fastener.

Finally, the shanks of the fasteners 178 and 180 are moved through slits or connecting portions extending from the large openings 188 to smaller openings 192 having a size corresponding to the shanks of the fasteners.

After installation of the gasket, the faucet base plate 38 is mounted. The base plate 38 includes a raised portion 194 having a pair of seats 196 for receiving the undersides of the heads of the fasteners 178 and 180 as best illustrated in FIG. 13. The base plate is installed in a manner similar to the gasket 186 in that relatively large openings 198 receive the heads of the fasteners 178 and 180 one at a time. Then the base plate is pivoted in order sequentially to move the fasteners 178 and 180 through connecting portions to smaller openings 200 coinciding with the seats 196. At this point, the gasket and base plate 38 are loosely positioned and the tie assembly 174 is suspended loosely by engagement of the fastener heads with the seats 196.

Mounting of the base plate 38 is completed by positioning the loosely connected base plate, gasket and tie assembly in the position indicated in FIG. 12 wherein the fasteners 178 and 180 extend through the connection holes 170 and wherein a pair of generally aligned center holes 202 and 204 formed respectively in the base plate 38 and gasket 186 are aligned with the center hole 172 in the sink deck 32. In this position, a center hole 205 in the tie bar 176 is also aligned. With these components properly positioned, the fasteners 178 and 180 are tightened from above the sink deck in order to draw the tie bar 176 firmly into engagement with the underside of the sink deck 32 thereby to clamp the gasket 186 and the base plate 38 firmly into position at the upper surface of the sink deck.

Installation of the faucet is completed by mounting the faucet body 40 to the base plate 38. Prior to installation, typically in factory assembly, the operating levers 48 and 50, the pinch valve assemblies 52 and 54, the mixing chamber assembly 62 and the water supply tubes 56 and 58 are assembled with the body 40. Consequently, the conduits 56 and 58 can be threaded through the large openings 198 in the base plate 38, through the large openings 188 in the gasket 186, and through the connection holes 170 in the sink deck 32 as illustrated in FIG. 12. As the body 40 is lowered into its final position illustrated in FIG. 2, the conduits 56 and 58 extend down into the under sink region, and are of more than ample length for interconnection with fittings normally supplied remote from the sink deck through which hot and cold water may be supplied to the faucet assembly 30. Thus the installation of the faucet assembly 30 requires no water connection operation and no fastener connection operation at the underside of the deck 32.

The engagement of the faucet body 40 with the base plate 38 is easily accomplished and results in a properly aligned and firm assembly. As the body is lowered into engagement with the base plate 38, a pair of mounting projections 206 formed on the base plate enter a pair of cooperating recesses 208 formed at the rear surface of the body 40 (FIGS. 11, 12 and 14). The underside of the spout portion 44 is defined by an upwardly and outwardly extending wall 210 of the base plate 38, and an opening 212 in this wall is aligned with an opening 214 formed in a projection or boss 216 provided internally of the body 40. A single fastener in the form of a screw 218 is inserted through the opening 212 and is threaded into the opening 214 in order to draw the body 40 forward and down against the base plate 38. The projections 206 are angled upwardly and rearwardly in order to cooperate with the recesses 208 in forcing the rear portion of the body 40 downwardly and forwardly as appears in FIG. 14.

As the fastener 218 is tightened, a number of projections of 220 spaced along the rear surface of the body 40 are brought into engagement with the upper surface the base plate 38 firmly to support the body 40 upon the base plate 38 (FIGS. 2 and 15). In addition, the lateral end portions of the base plate 38 are provided with a pair of projections 222 cooperating with aligned projections 224 formed in the body 40. Engagement of the projections 222 and 224, seen in FIGS. 12 and 15, assures lateral alignment between the base plate 38 and the body 40 as the fastener 218 is tightened. An abutment 226 formed adjacent the boss 216 comes into contact with the base plate wall 210 when the fastener 218 is fully tightened as shown in FIG. 2 so that excessive tightening of the fastener is discouraged. In order to recondition the faucet in the manner described above, the fastener 218 may be removed to free the body 40 from the base plate 38 without disturbing the mounting of the base plate 38 on the sink deck 32.

After mounting of the body 40 to the base plate 38, the installation of the faucet assembly 30 is completed. Prior to operation of the faucet, the water supply tubes 56 and 58 are interconnected to sources of hot and cold water. Since these sources are typically located in or near a wall or floor below and remote from the sink deck 32, these connections can be made in a relatively accessible location. The body 40 includes an opening 228 vertically aligned with the center openings 172, 202, 204 and 205 in order to receive a drain pull rod.

While the invention has been described with reference to details of the illustrated embodiment, such details are not intended to limit the scope of the invention as defined in the following claims.

What is claimed and desired to be secured by Letters Patent of the United States is:

1. A faucet assembly for mounting on a sink deck with spaced connection holes of predetermined configuration, said faucet assembly comprising a base plate adapted to overlie the sink deck top surface and the connection holes; a faucet body; fastening means accessible from above the sink deck for securing said body to said base plate, a mounting assembly including first mounting means adapted to underlie the sink deck adjacent said connection holes and including vertical portions connected to said first mounting means and adapted to extend through the connection holes and engageable with said base plate for securing said base plate above the sink deck.

2. The faucet assembly of claim 1, further comprising valve means supported by said faucet body, and a pair of continuous, pliable conduits extending from said valve means through said base plate and adapted to extend through said connection holes to the region below the sink deck.

3. The faucet assembly of claim 1, said first mounting means comprising a tie member extending horizontally between said connection holes.

4. The faucet assembly of claim 3, said mounting assembly being of a generally U-shape and having a cross-section smaller than the predetermined configuration of the water connection holes throughout at least one leg and the base of the U, permitting said one leg and base to be inserted through one connection hole and said one leg then to be inserted through the other connection hole.

5. The faucet assembly of claim 4, said vertical portions of said mounting assembly comprising threaded fasteners.

6. The faucet assembly of claim 5, said threaded fasteners having shanks in threaded engagement with said tie member and having heads engageable with said base plate.

7. A faucet assembly for use with a sink deck having a pair of spaced apart connection holes, said faucet assembly comprising;

a base plate and a body defining a housing having a base portion and an upwardly extending spout portion;

said base plate hvaing a first segment adapted to overlie the upper surface of the sink deck and having a second segment extending upwardly from said first segment and defining a lower surface of said spout portion;

said body defining the rear and side surfaces of said base portion and defining the side and top surfaces of said spout portion;

a tie bar assembly including a first portion adapted to underlie the lower surface of the sink deck and extend between said water connection holes;

said tie bar assembly including a pair of second portions interconnecting said first tie bar portion and said first base plate segment; and fastener means interconnecting said second base plate segment and said body for securing said body to said base.

8. The faucet assembly of claim 7, further comprising interfitting projection and recess means defined on said base portion rear surface of said body and on said first base plate segment.

9. The faucet assembly of claim 7, said fastener means consisting of a single screw fastener extending through said base plate and into said body.

* * * * *